(12) United States Patent  
Van Bael et al.

(10) Patent No.: US 8,169,435 B2
(45) Date of Patent: May 1, 2012

(54) GENERATING AND RENDERING THREE DIMENSIONAL MODELS OF FLEXIBLE PACKAGING

(75) Inventors: Kristiaan K. A. Van Bael, Sint-Laureins (BE); Frank R. M. Vernaillen, Herzele (BE)

(73) Assignee: Esko IP NV, Kortrijksesteenweg (BE)

( * ) Notice: Subject to any disclaimer, the term of this patent is extended or adjusted under 35 U.S.C. 154(b) by 756 days.

(21) Appl. No.: 12/267,222

(22) Filed: Nov. 7, 2008

(65) Prior Publication Data

US 2009/0146995 A1 Jun. 11, 2009

Related U.S. Application Data

(60) Provisional application No. 60/992,952, filed on Dec. 6, 2007.

(51) Int. Cl.
*G06T 15/00* (2006.01)

(52) U.S. Cl. ........ 345/419; 345/420; 345/581; 345/582; 345/426; 382/300

(58) Field of Classification Search .................. 345/419, 345/420, 423, 426, 427; 382/300
See application file for complete search history.

(56) References Cited

U.S. PATENT DOCUMENTS

| | | | | |
|---|---|---|---|---|
| 5,253,339 A * | 10/1993 | Wells et al. | .................... | 345/426 |
| 5,333,248 A * | 7/1994 | Christensen | .................... | 345/442 |
| 5,404,426 A * | 4/1995 | Usami et al. | .................... | 345/420 |
| 6,348,921 B1 * | 2/2002 | Zhao et al. | .................... | 345/428 |
| 6,456,289 B1 * | 9/2002 | O'Brien et al. | .................... | 345/473 |
| 6,909,431 B1 * | 6/2005 | Anderson et al. | .................... | 345/473 |
| 7,298,374 B2 * | 11/2007 | Styles | .................... | 345/473 |
| 7,339,586 B2 * | 3/2008 | Guhring | .................... | 345/424 |
| 2005/0168460 A1 * | 8/2005 | Razdan et al. | .................... | 345/419 |
| 2007/0030266 A1 | 2/2007 | Styles | .................... | 345/420 |
| 2007/0055401 A1 | 3/2007 | Van Bael et al. | .................... | 700/98 |
| 2007/0188490 A1 * | 8/2007 | Kanai et al. | .................... | 345/423 |

OTHER PUBLICATIONS

Karkanis, Tasso; Curvature dependent implicit surface tiling; 1999; vol. 38/04 of Masters Abstracts. p. 1037. 54 Pages.*
Philip, G.M. et al.; A precise method for determining contoured surfaces; May 1, 1982; APEA J.; (Australia); Journal vol. 22:1.*
Sirkett, D.M et al.; Simulating the behaviour of folded cartons during complex packing operations; Dec. 2006; Proceedings of the Institution of Mechanical Engineers, Part C (Journal of Mechanical Engineering Science), vol. 220, No. C12, pp. 1797-1811.*

(Continued)

*Primary Examiner* — Xiao M. Wu
*Assistant Examiner* — Todd Buttram
(74) *Attorney, Agent, or Firm* — Dov Rosenfeld; Inventek

(57) ABSTRACT

A method, and apparatus, and a computer-readable medium encoded with instructions to carry out a method. The method is of rendering a model of a surface of wrinkly material such as paper or foil, e.g., a model of packaging on a display device. The method includes accepting a description of the different parts of the surface of the packaging, and how and where any of the parts are connected, discretizing to form a mesh, modelling the physics of the mesh, running a simulation to find a stable end-state for the mesh, modifying the mesh to visually smooth the mesh in a way that is perceived as typical for flexible packaging material; and rendering the model on a display device. The modifying the mesh is to visually smooth the mesh includes modifying during the rendering or modifying prior to the rendering.

23 Claims, 17 Drawing Sheets

OTHER PUBLICATIONS

Dheeravongkit, Arbtip et al.; Inverse Pre-Deformation of Tetrahedral Mesh for Large Deformation Finite Element Analysis; 2005; Computer-Aided Design & Applications, vol. 2, No. 6, 2005, pp. 805-814.*

D. Baraff and A. Witkin.: "Large Steps in Cloth Simulation." *Proceedings Computer Graphics* (SIGGRAPH 1998), Annual Conference Series: pp. 43-54, 1998, retrieved on Nov. 16, 2007 at http://www.cs.cmu.edu/~baraff/papers/sig98.pdf.

R. Bridson, S. Marino and R. Fedkiw: Simulation of Clothing with Folds and Wrinkles, in Proceedings, 2003 Proc. ACM/Eurographics/SIGGRAPH Symposium on Computer Animation 2003, pp. 28-36. retrieved on Nov. 23, 2007 at http://www.cs.ubc.ca/~rbridson/docs/cloth2003.pdf.

M. Kilian, S. Floery, Z. Chen, N. J. Mitra, A. Sheffer, H. Pottmann, *Curved Folding*, ACM SIGGRAPH, vol. 27, No. 3, pp. 75-1-75-9, 2008.

M. Kilian, S. Floery, Z. Chen, N. J. Mitra, A. Sheffer and H. Pottmann, "Developable Surfaces with Curved Creases." In Proceedings of Advances in Architectural Geometry (2008). http://graphics.stanford.edu/~niloy/research/index.html.

Extended European Search Report for EPO Application No. 08170964.4 dated Mar. 23, 2009.

Y. Wang, C.C.L. Wang, and M.M.F. Yuen. "Fast energy-based surface wrinkle modeling," Computers and Graphics, Elsevier, Great Britain, vol. 30, No. 1., Feb. 1, 2006, pp. 111-125.

J.F. Blinn. "Simulation of Wrinkled Surfaces," SIGGRAPH Comput. Graph., vol. 12, No. 3, Aug. 1978, pp. 286-292.

W.H. Frey. "Boundary Triangulations Approximating Developable Surfaces That Interpolate a Closed Space Curve," International Journal of Foundations of Computer Science, World Scientific Publishing Company, Singapore, vol. 13, No. 2., Apr. 1, 2002, pp. 285-302.

K. Tang and C.C.L. Wang. "Modeling Developable Folds on a Strip," Journal of Computing and Information Science in Engineering, American Society of Mechanical Engineers, New York, NY, vol. 5, No. 1., Mar. 1, 2005, pp. 35-47.

Communication from Examining Division of EPO re counterpart EPO Application No. 08170964.4 dated Jun. 23, 2010.

Kappel M R: "Shading: Fitting a Smooth Intensity Surface", Computer Aided Design, Elsevier Publishers BV. Barking, GB, vol. 27, No. 8, Aug. 1, 1995.

* cited by examiner

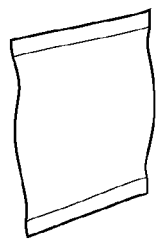
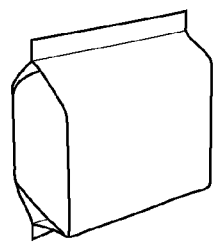
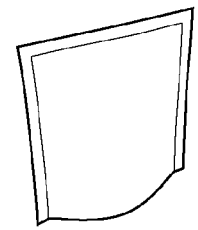
FIG. 16A    FIG. 16B    FIG. 16C
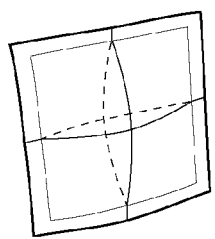
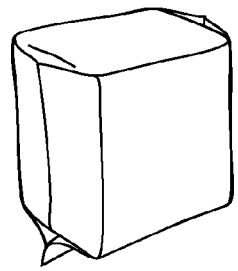
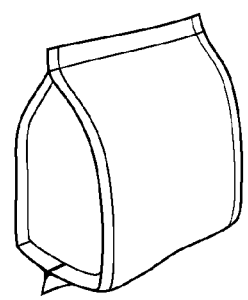
FIG. 16D    FIG. 16E    FIG. 16F

GENERATING AND RENDERING THREE DIMENSIONAL MODELS OF FLEXIBLE PACKAGING

RELATED APPLICATIONS

The present application claims priority of U.S. Provisional Application No. 60/992,952 filed 6 Dec. 2007 to inventors Van Bael et al. The contents of such Application No. 60/992,952 are incorporated herein by reference.

FIELD OF THE INVENTION

The present invention related to packaging design, and in particular, to a method and apparatus for generating and rendering a realistic looking three-dimensional model of an item of flexible packaging, such as crisp bags, gusseted bags and stand-up pouches.

BACKGROUND

Flexible packaging with printing thereon is commonly used. Examples include crisp bags, gusseted bags and stand-up pouches. A common bag of frozen peas in the freezer department of a supermarket is one example of such packaging. In packaging design, a workflow is followed to design the packaging, including designing the printing on the package. For such a workflow, there is a desire for 3-D visualization of the packaging, e.g., to see the result of design decisions. Currently there are no specialized modeling tools for flexible packaging shapes and existing general purpose modeling tools do not produce a sufficiently realistic rendering of a model usable in the design.

DESCRIPTION OF THE DRAWINGS

FIGS. 16A, 16B, 16C, 16D, 16E, and 16F show different types of packaging for which templates are provided in an example embodiment of the invention.

DESCRIPTION OF EXAMPLE EMBODIMENTS

Overview

Figure 1:
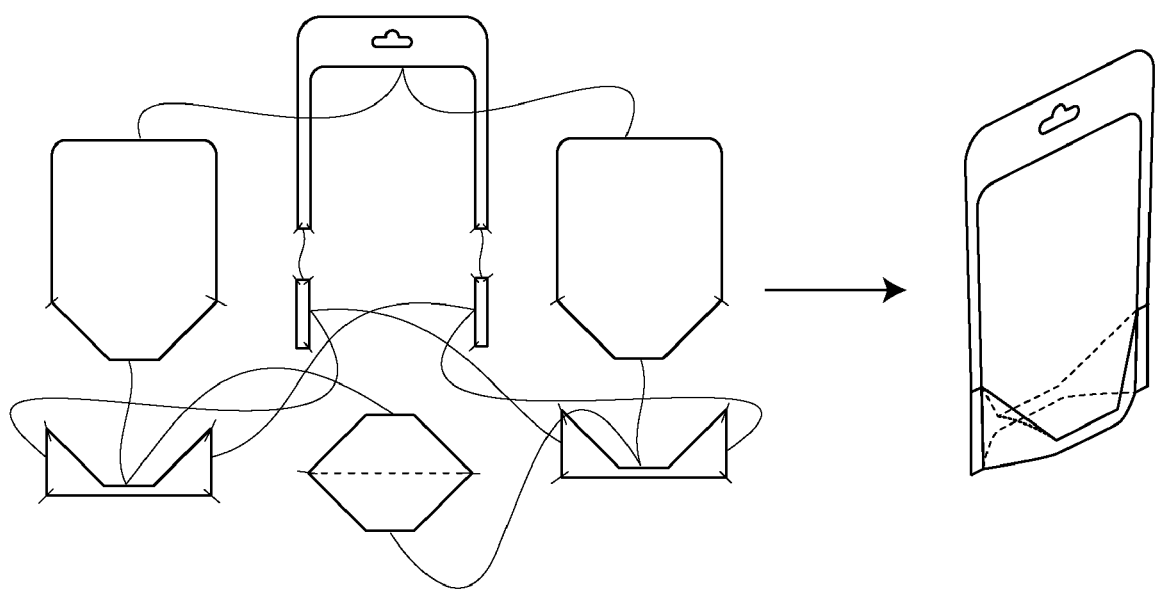
FIG. 1 shows on the right an example of a garment of a simple stand-up pouch whose structure can be modeled according to an embodiment of the present invention. On the left are shown eight parts that are connected at certain edges.

Embodiments of the present invention include a method, and apparatus, and logic encoded in one or more computer-readable tangible medium to carry out a method. The method is of rendering a model of a surface of wrinkly material such as paper or foil on a display device. An example of such a surface of wrinkly material is packaging.

Particular embodiments include a method of operating a processing apparatus, the method comprising:

accepting a garment, being a description of the different parts of the surface of the packaging, and how and where any of the parts are connected;

discretizing the garment to form a mesh;

modelling the physics of the mesh, and running a simulation to find a stable end-state for the mesh; and modifying the mesh to visually smooth the mesh in a way that is perceived as typical for flexible packaging material; and rendering the model on a display device, wherein the modifying the mesh to visually smooth the mesh includes modifying during the rendering or modifying prior to the rendering.

Particular embodiments include an apparatus comprising a processing system programmed to carry out a method of rendering a model of a surface of wrinkly material, e.g., of packaging on a display device. The method includes:

accepting a garment, being a description of the different parts of the surface of the packaging, and how and where any of the parts are connected;

discretizing the garment to form a mesh;

modelling the physics of the mesh, and running a simulation to find a stable end-state for the mesh; and modifying the mesh to visually smooth the mesh in a way that is perceived as typical for flexible packaging material; and rendering the model on a display device, wherein the modifying the mesh to visually smooth the mesh includes modifying during the rendering or modifying prior to the rendering.

Particular embodiments include a computer readable medium encoded with instructions that when executed by one or more processors of a processing system cause carrying out a method of rendering a model of a surface of wrinkly material, e.g of packaging on a display device. The method includes:

accepting a garment, being a description of the different parts of the surface of the packaging, and how and where any of the parts are connected;

discretizing the garment to form a mesh;

modelling the physics of the mesh, and running a simulation to find a stable end-state for the mesh; and modifying the mesh to visually smooth the mesh in a way that is perceived as typical for flexible packaging material; and rendering the model on a display device, wherein the modifying the mesh to visually smooth the mesh includes modifying during the rendering or modifying prior to the rendering.

The instructions on the computer readable medium can form a software product.

Particular embodiments may provide all, some, or none of these aspects, features, or advantages. Particular embodiments may provide one or more other aspects, features, or advantages, one or more of which may be readily apparent to a person skilled in the art from the figures, descriptions, and claims herein.

Known Methods for Physical Simulation of Flexible Surfaces

Physical simulation of flexible surfaces is already a well investigated field, and is sometimes called "Thin Shell" simulation and also "Cloth" simulation. As an example of known art, in the field of 3-D animation, it is known to use physical simulation to for generating a realistic rendering of clothing. See for example D. Baraff and A. Witkin.: "Large Steps in Cloth Simulation." *Proceedings Computer Graphics*, Annual Conference Series: pp. 43-54, 1998, downloadable on Nov. 16, 2007 at http://www.cs.cmu.edu/~baraff/papers/sig98.pdf.

The general principles used in known method of clothing simulation include defining a "garment,", discretizing the different parts of a garment to produce a mesh, formulating an energy function for the mesh, defining constraints to the mesh, using the energy function and constraints for a movement equation that calculates position and speed of the mesh nodes at different moments in time of motion, or determining a stable end-state in the non-motion case, and rendering the result to produce a visualization.

Each of these is now described below in more detail.

It has been our experience that known state-of-the-art surface simulation methods are not well suited for flexible packaging. The resulting 3-D images don't have realistic wrinkles We think that the reason of the typical wrinkles of materials like paper and foils are the elastic properties of these flexible packaging substrates.

Known Methods of Simulation of Flexible Surfaces

The steps used in conventional simulation of clothing are now described in more detail.

Garments

It is known to simulate simple surfaces such as planar triangles and rectangular surfaces. With clothing, the surface to be simulated is not always a simple rectangle. It can include several irregularly shaped parts that are connected to each other at certain edges or points like the garment of a piece of clothing. Such surfaces are called "garments" herein. The term garments doesn't apply only to the simulation of clothing. For example, flexible packaging can also include several parts that are connected at edges, even though the parts might have been produced out of a single sheet of material.

FIG. 1 shows an example of a garment of a simple stand-up pouch, shown on the right, including on the left eight parts that are connected at certain edges. This type of packaging is produced out of a single sheet by folding, sealing and trimming operations. Some of the parts have two or four layers of substrate, sealed together.

One feature of the present invention is visualizing the type of garment that includes several parts as shown in the example of FIG. 1, and that includes flexible packaging that can wrinkle. It is our experience that present-day known methods do not provide realistic visualization of such packaging that includes wrinkling.

Discretizing

In prior art method of visualization of flexible surfaces (and in embodiments of the present invention), the parts of the garment are discretized into a mesh of triangular surfaces—triangles, on in alternate embodiments, quadrangular surfaces—quadrangles. In known method of cloth simulation, this mesh is often a regular mesh of triangles. A finer mesh gives more realistic results than a coarser mesh, but it is also computationally more expensive. For a realistic simulation of a simple element such as a stand-up poach, prior art methods may require a mesh of 10,000 elements or more.

Figure 2A:
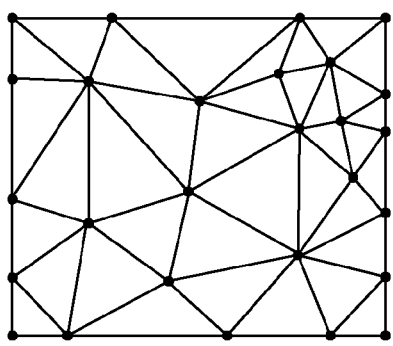
FIG. 2A shows how a simple surface, in this case a rectangular surface is discretized in a triangular mesh according to an embodiment of the present invention.
Figure 2B:
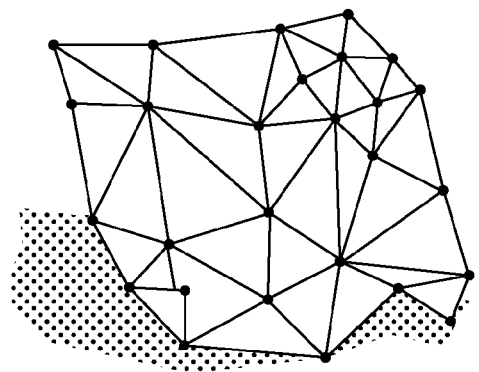
FIG. 2B shows the results of giving the mesh nodes of the example of FIG. 2A positions in 3-D space according to an embodiment of the present invention.

FIG. 2A shows how a simple surface, in this case a rectangular surface is discretized in a triangular mesh, the vertices of the triangles forming nodes. FIG. 2B shows the results of giving the mesh nodes positions in 3-D space. With the positions for the different nodes give the mesh what is called a state. Hence FIG. 2B shows one state for the mesh of FIG. 2A.

Energy Function and Movement Equation

In cloth simulation, an energy function is formulated for the mesh, in the form of an energy function that defines the energy of the mesh as a function of the node positions. Thus, for a given mesh state, it defines the total energy of the mesh.

$$E(\vec{x}_0, \vec{x}_1, \vec{x}_2, \vec{x}_3, \ldots, \vec{x}_n)$$

Where there are n+1 nodes and the $\vec{x}_i$, i=0, ... n are the positions for the nodes.

Depending on the application, this energy function can include terms for elasticity, e.g., stretch, shear, bending, and also gravity. The energy function also can include external force elements such as wind. When solving a problem in which the energy function is used in a movement equation that calculates position and speed of the mesh nodes at different moments in time, the n+1 speed vectors of each node are also variables of the energy function and the energy function can include terms for dynamic friction and damping.

One way to look at the energy function is that it defines the forces that work on the mesh: The gradient of the energy-function can be seen as the forces on the mesh nodes:

$$\vec{f}_i = \frac{\partial E}{\partial \vec{x}_i}$$

The above is known for clothing simulation. In embodiments of the present invention, for packaging design, the energy function includes terms for one more of stretch, shear and bend. In different embodiments, the energy function also includes terms for gas pressure or hydrostatic energy, or both.

Dynamic Problem: In 3-D animation, the energy function is used in a movement equation that calculates position and speed of the mesh nodes at different moments in time.

Static Problem: For some applications, only a stable end-state is required. In that case the challenge is to find a mesh state where the energy function reaches a local minimum.

Both the dynamic and the static problem involve iterative numerical methods, e.g., conjugate gradient optimization, to cope with the large dimensionality of the energy function.

Constraints, Collisions and External Forces

In clothing simulation, as in the packaging design problem dealt with by embodiments of the present invention, the mesh may be subject to one or more constraints; one or more parts of the mesh could be attached to other objects to form constraints, or attached to fixed positions in space to form constraints.

As another constraint, during the iterations, the method includes preventing parts of the surface from move through other parts of the surface or other objects that exist in the same 3-D space.

Several methods are known for applying such boundary conditions and collision avoidance.

In flexible packaging design, the garment itself defines such constraints as the connected edges. Depending on the particular packaging, other constraints might include the physical object being packaged, e.g., a chocolate bar, or the floor the package is on, modeled as a virtual floor that the package stands on and obviously that a package cannot move through.

Rendering the Result

Simulating appearance includes rendering. We have found that simply rendering the stable mesh as a polyhedron does not look very realistic. For example, so rendering the flat triangles make the package look too facetted.

One method to add realism include applying filtering such as low-pass filtering to the mesh prior to or during the rendering to make the edges appear less hard.

One known method of adding realism to visualization is to add shading. Shading methods are known, such as using shading method that uses what is commonly called "Phong interpolation". Given a triangle and normal vectors at each corner, Phong interpolation includes defining a normal for every position on the triangle. The shading method evaluates by interpolation the normal for every pixel in the triangle and uses it to calculate the proper pixel color. There is a wide variety of shading methods that use a normal vector. Shading methods with Phong interpolation can render a triangle with a curved appearance without actually changing its geometry. When neighboring triangles share normals at their corresponding corners, the complete surface can get a smooth appearance.

Figure 3:
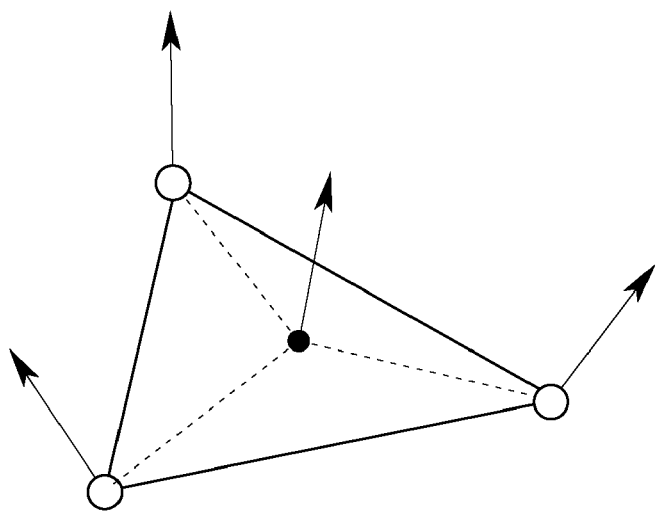
FIG. 3 shows an example of applying Phong interpolation according to an embodiment of the present invention.

FIG. 3 shows an example of applying Phong interpolation. With such interpolation, the color of a point inside a triangle is calculated using an interpolating normal that is interpolated between the three vertex normals.

Simulating Wrinkling

One feature of the present invention is the simulation of wrinkling of surfaces of flexible packaging, including any printing thereon.

Limitations of Known Methods of Simulating Wrinkling

It has been our experience that that known surface simulation methods are not well suited for flexible packaging that includes wrinkling. The resulting 3-D images from known surface simulation do not have realistic looking wrinkles. This might be because of the typical wrinkles of materials like paper and foils may be caused by elastic properties of these flexible packaging substrates and such are not well simulated by known methods.

Because they are very thin yet strong, most packaging foils and paper sheets have a very high resistance for stretching and shearing, but a much lower resistance to bending. Known surface simulation cannot handle such combinations of high stretch and shear resistance, and low bending resistance very well. This might be why such known methods may not provide very realistic looking visualizations of wrinkling.

One artifact of discretization when using an energy function is that the term for stretch energy will also respond to certain bend states. As a result, a simulation using such an energy function with a high stretch modulus might cause the material to looker stiffer than intended. With regular meshes, this artifact is highly anisotropic. These are not desirable properties for simulating flexible packaging that includes wrinkling. Hence, one embodiment of the invention uses an irregular mesh, e.g., an irregular triangular mesh.

Techniques such as Phong shading that are smoothing are general solutions for curved material; when used on the shapes of flexible substrates, the rendered result can appear too rounded and "thick". This is not typically desirable for producing wrinkling.

Parabolic Surfaces

When developing embodiments of our invention, we looked at possible descriptions of why flexible packaging wrinkles. Of course, embodiments of the present invention work in that they produce usable results. This does not depend on whether our theories are right or not, and the theory presented here should not be regarded as a limitation on the invention. The invention is limited by the claims and their legal equivalents.

Consider a very thin shell of an elastic material with very high stretch and shear modulus and a lower bend-modulus. Consider a parametrical surface describing the shape of the material. It is likely that the bend resistance will keep the material smooth, e.g., keep the surface $1^{st}$ order continuous. It is also likely that the stretch and shear resistance will keep the surface from distortions, by which we mean local stretch or shear. For the surface, this means that any path on the surface has the same length as the corresponding path in the parametric space.

A point on a surface is defined to be a parabolic point if the secondary curvature is 0. Such a point is neither convex, nor a saddle point. A cylinder is an example of a surface that is completely made up of parabolic points. A surface made up of parabolic points is called a parabolic surface.

It can be shown that each point on a surface that is smooth and has no local deformation is a parabolic point. It also can be shown that for surfaces that are completely smooth and parabolic, one can draw at least one straight line segment through every point of the surface. This line segment will run from boundary to boundary of the surface and fall completely within the surface. This line segment runs along the direction of zero curvature and hence has a constant normal. One could call these straight lines "iso-normals". If a surface is partially parabolic, the properties of parabolic surfaces still apply for and within the parts that are parabolic.

Figure 4:
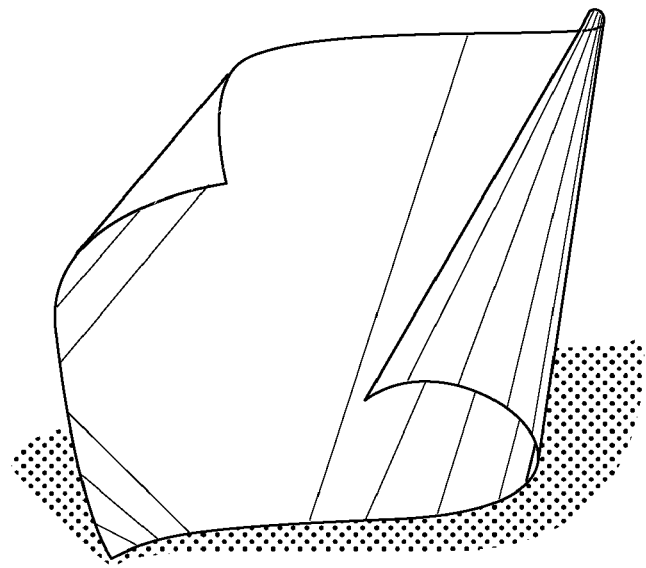
FIG. 4 shows one example of an undistorted, smooth surface used to describe an embodiment of the present invention.

FIG. 4 shows one example of an undistorted, smooth surface. This surface is completely parabolic. Some of the iso-normals are drawn as thin lines.

Figure 5:
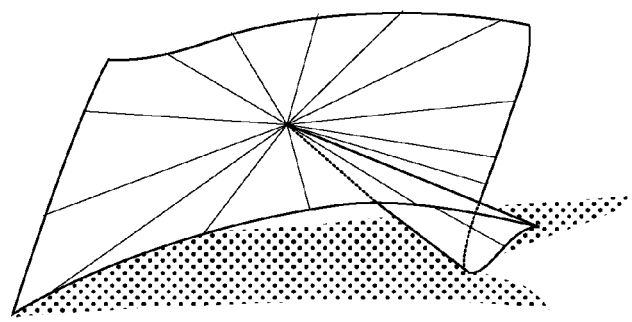
FIG. 5 shows an example of another undistorted surface, shaped like a generalized cone, the example surface used to describe an embodiment of the present invention.

FIG. 5 shows an example of another undistorted surface, shaped like a generalized cone. The surface is smooth except for one singular point. So except for that singular point, the surface is parabolic. The singular points also count as one of the boundaries of the smooth part so that iso-normals can also start or end at the singular point.

Geometrical Properties of Parabolic Surfaces (with Some Singular Points)

Parabolic surfaces generally have the following geometrical properties:

Smooth, except maybe at some singular points

Parabolic: Secondary curvature is zero, except at the singular points where the curvature is undefined.

Through each point one can draw at least one straight iso-normal that runs from boundary to boundary. In this, singular points count as boundaries too.

The inventors have found that in real flexible packaging, the stretch and shear resistance is relatively very high. Small amounts of distortion thus can occur. However, we have found that these geometrical properties are typical to flexible packaging. Embodiments of the invention explicitly use this knowledge when rendering flexible packaging to obtain a higher level of visual realism.

Design Workflow on a Computer System.

The design workflow for designing packaging that, e.g., incorporate graphics, and that is viewable on a display of a computer system has many elements in common with a design system described in co-owned U.S. patent application Ser. No. 11/220,395 titled TWO-DIMENSIONAL GRAPHICS FOR INCORPORATING ON THREE-DIMENSIONAL OBJECTS, published as U.S. 20070055401, the contents of which are incorporated herein by reference. In U.S. 20070055401, the purpose is designing cartons for cutting and manufacturing. The present invention is concerned with simulating flexible packaging, and how to modify elements of U.S. 20070055401 and incorporate them with the elements described herein would be straightforward to one in the art from the description herein and from U.S. 20070055401.

Embodiments of the present invention can be embodied in a tangible medium encoding instruction that when executed by one or more processors of a processing system, implement one or more of the methods described herein. Other embodiments are in the form of one or more of the methods described herein. Other embodiments are in the form of hardware configured to carry out one or more of the methods described herein.

Multi-Step Approach

Figure 6:
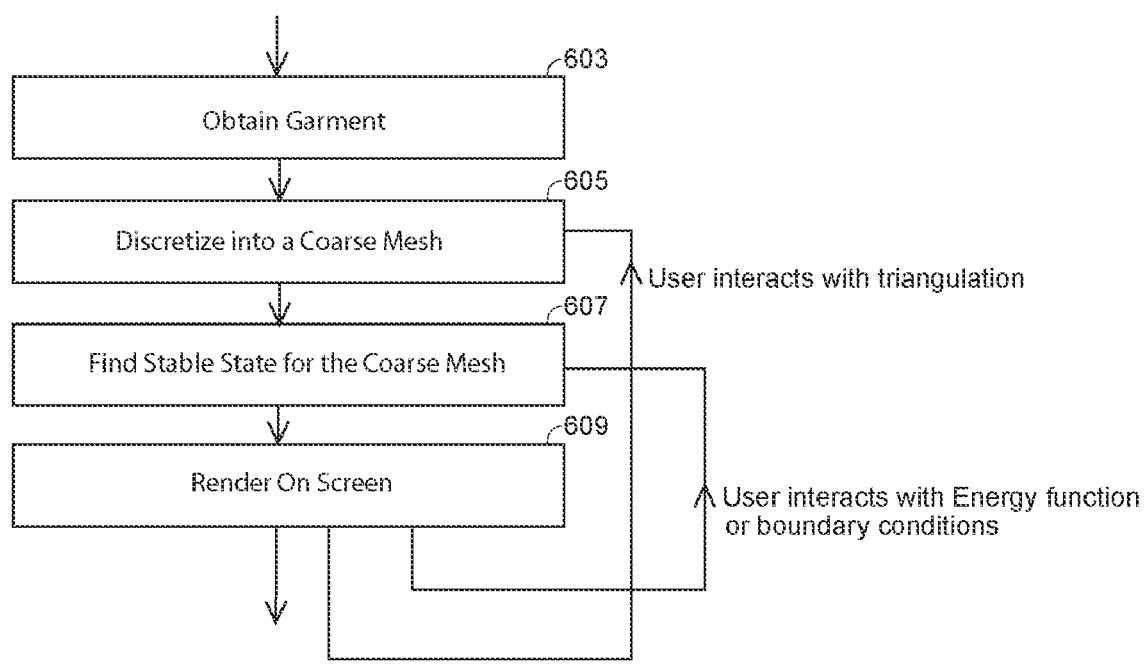
FIG. 6 shows a simplified flowchart of one embodiment of the present invention for generating and rendering a 3-D model of a piece of flexible packaging.

FIG. 6 shows a simplified flowchart of one embodiment of the present invention for generating and rendering a 3-D model of a piece of flexible packaging. The method embodiment includes four steps:

603. Obtain a "garment." This is a description of the different parts of the surface and how and where they are connected to each other.

605. Obtain a discretization of the garment. In one embodiment of the present invention, this is a relatively coarse triangular mesh.

607. Run physical simulation on the relatively coarse triangular mesh to find a stable end-state for the coarse mesh.

609. Make the solution visually smoother. During (or prior to) rendering the model on a display device, visually smooth the mesh in a way that is perceived as typical for flexible materials.

If the output is not as desired by the user, one embodiment of the method provides a user interface for the user to interact with the model and enter information to change the parameters used in step 605 or step 607 and repeat the process.

Obtain Garment

Figure 7:
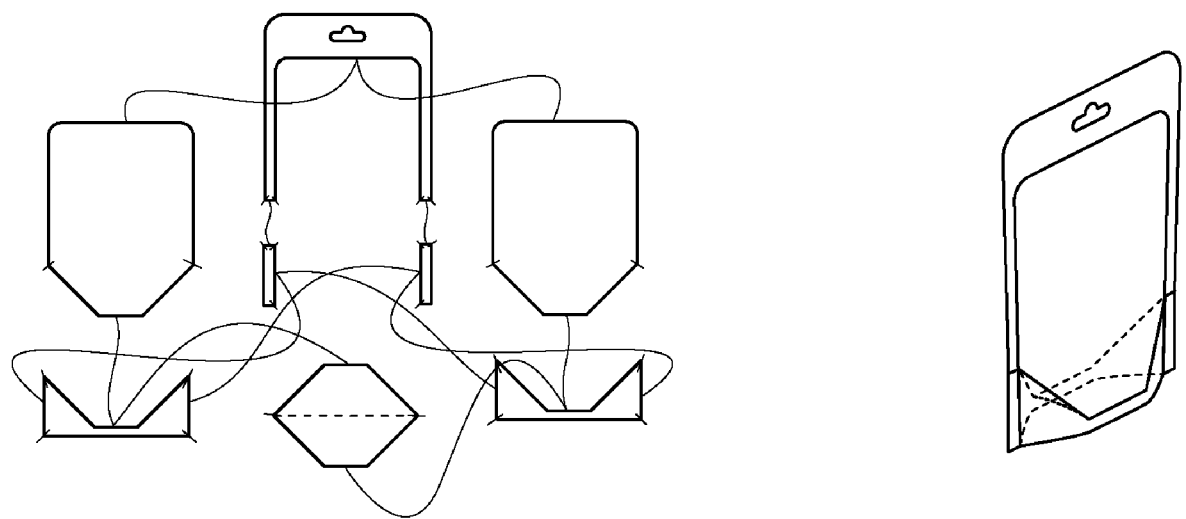
FIG. 7 shows an example of a garment of a simple stand-up pouch, including eight parts that are connected at certain edges, whose structure can be modeled according to an embodiment of the present invention.

A garment is a surface to be simulated, including one or more several possibly irregularly shaped parts that are connected to each other at certain edges or points like the garment of a piece of clothing. As used herein, a garment applies to flexible packaging that can include several parts that are connected at edges. Such parts might even have been produced out of a single sheet of material FIG. 7 shows an example of a garment of a simple stand-up pouch, including eight parts that are connected at certain edges. This type of packaging is produced out of a single sheet by folding, sealing and trimming operations. Some of the parts have two or four layers of substrate, sealed together.

Many data structures are possible for representing a garment. In one embodiment, a data structure for a garment includes: representing the parts by a set of polygons, and for the connected edges, classifying the edges of the polygons into classes, wherein two edges that are in the same class have end-points on the same locations.

In one embodiment, the data structure is expanded to make it more suitable for flexible packaging. Rather than representing each part by a single polygon, each garment part may be represented by a stack of one or more congruent polygons with their vertices on the same locations. In the classification, corresponding edges or polygons from the same part must be in the same class.

Figure 8:
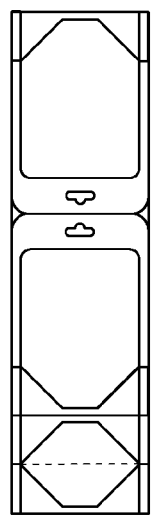
FIG. 8 shows polygon vertices that have corresponding texture coordinates that can match the position on a flat sheet of packaging material that has not been processed yet according to an embodiment of the present invention, applied to the example of FIG. 7.

The polygon vertices can have corresponding texture coordinates. These texture coordinates can match the position on a flat sheet of packaging material that has not been processed yet. This will make it easier later to integrate the press graphics with the 3-D rendering. FIG. 8 shows this for the example of FIG. 7.

In one embodiment, a pre-defined set of packaging types is supported. For each of the types, the method, e.g., as software executing on a processing system, generates the proper garment data. In one embodiment, the implementation is parametric; the actual vertex and texture coordinates are linear expressions of user-defined dimensions.

Figure 9:
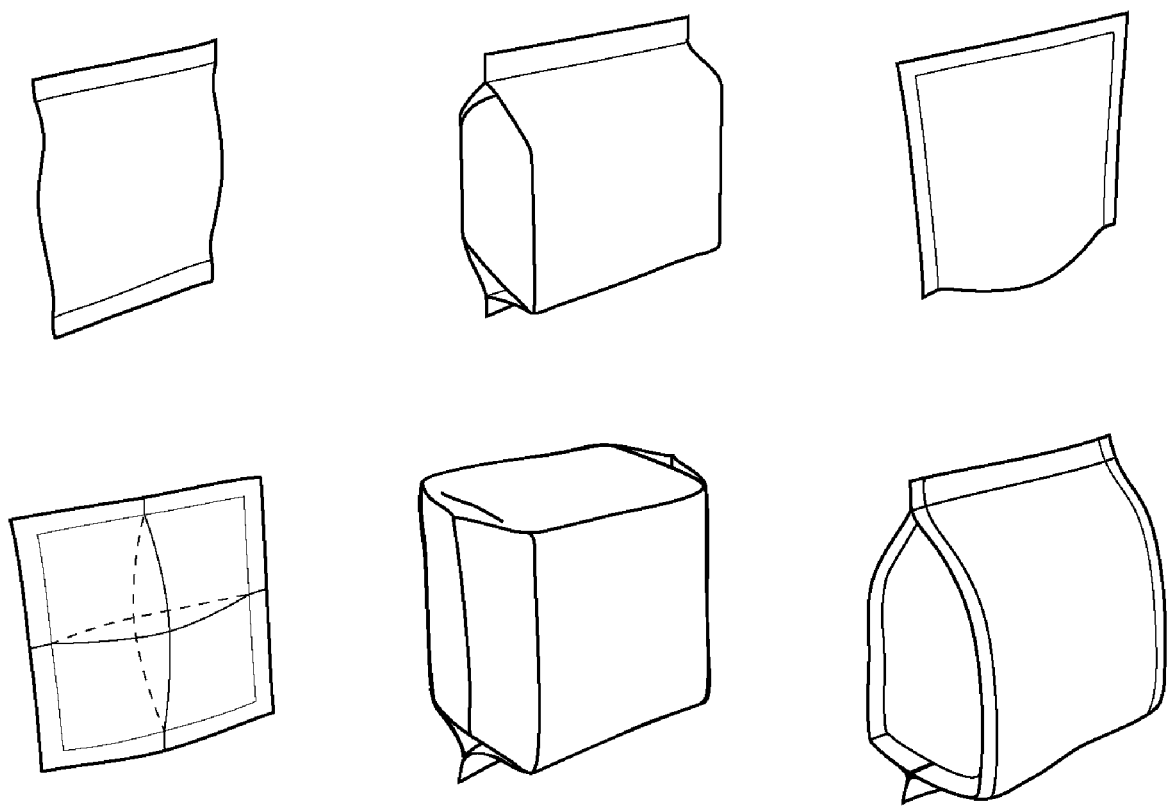
FIG. 9 shows examples of some packaging types in a pre-defined set of types supported by an example embodiment of the invention.

FIG. 9 shows examples of some packaging types in the pre-defined set.

Obtaining a Discretization of the Garment (the Mesh)

Based on the garment information, one embodiment includes obtaining a discretization of the garment-discretizing the surface. In one embodiment, the method discretizes the surface into a triangular mesh. When triangulating the different parts of the garment, the method includes ensuring that connected edges share nodes in the triangular mesh.

Relatively Coarse Mesh

One embodiment of the present invention uses a relatively coarse triangular mesh. In many modern surface simulation methods, finer meshes are considered better. However, this comes at the cost of computationally complexity. In one embodiment of the present invention, a relatively coarse mesh is used on purpose, not necessarily because of computational cost, but rather in anticipation of the expected wrinkle behavior. As will be clear from the description below, the positions of the coarse mesh-nodes are candidate singular points of the simulated surface.

Mesh not Necessarily Regular

There are many methods known for creating regular, random or semi-random triangulations of a given surface. Since flexible packaging has a chaotic nature, and since the chosen triangulation will be apparent in the end-result, the inventors have discovered that regular triangulation may produce an unrealistic looking visualization. Hence, in one embodiment, the triangulation is irregular. In one embodiment, the method accepts a maximum edge size from the user. The polygon edges are then divided if needed to make them smaller than the user specified size. The method includes using a constrained Delaunay triangulation method and Delaunay refinement to add nodes. A Delaunay triangulation of a vertex set is a triangulation of the vertex set with the property that no vertex in the vertex set falls in the interior of the circumcircle (circle that passes through all three vertices) of any triangle in the triangulation. Delaunay triangulation methods are well known in the art, and no further citation is included herein. In one embodiment, adding nodes includes applying a relatively small amount of random jitter to the position of the added node. The method continues adding nodes until the longest edge is shorter than the user specified length. Alternate embodiments use alternate other random or pseudo-random or semi-random triangulations, and it is expected that such alternate triangulation methods also can be used.

The inventors have found that with embodiments of the present invention, a pseudo-random mesh of about 300 triangles can yield a realistic looking model of a piece of flexible packaging such as a stand-up pouch. With a prior-art cloth simulation methods, one would use at least 10.000 discretization elements to simulate such a garment. Thus, embodiments of the present invention use a relatively coarse mesh-courser by a factor of at least one order of magnitude, possibly two orders of magnitude.

User Interaction to Modify the Triangulation

One embodiment provides a mechanism in the form of a user interface for the user to enter different attributes of the triangulation. The user interface provides the user with an interactive tool operative to change one or more parameters for the triangulation.

One embodiment includes presenting the user with a user interface that allows the user to specify one or more parts of the surface where the user desires the triangulation to be finer than in other parts. The method includes accepting from the user via the user interface one or more indications of one or more parts of the surface where the user desires the triangulation to be finer than in other parts.

One embodiment further includes presenting the user with a user interface that allows the user to specify two points on the mesh such that after triangulation, the two points are connected by a straight (in texture space) line that is made out of one or more triangle edges. The method includes accepting from the user via the user interface one or more indications of one or more sets of two points on the mesh such that after triangulation, the two points are connected by a straight (in texture space) line that is made out of one or more triangle edges.

Other Modifications of the Triangulation

One method embodiment includes using one or more other properties of the surface to influence the triangulations.

In one embodiment, in the case the package is for containing a solid object having a shape, one method of triangulation includes using properties of the shape to influence the triangulation. One embodiment includes aligning triangle edges perpendicular to the main curvature of the part of the solid that the packaging might come in contact with.

One embodiment includes modifying the triangulation to achieve a lower energy value, based, e.g., on the results of running a simulation, including defining energy equations and running the movement equations that calculate position and speed of the mesh nodes at different moments in time of motion.

In another embodiment, the triangulation method and the node position search method are combined into a single search space wherein a (local) minimum energy is to be found.

Running the Physical Simulation to Find End State(s)

One embodiment includes running a physical simulation on the coarse-possibly modified-mesh, including defining an energy function and running the movement equations. The modification of the mesh is as discussed herein above.

One embodiment includes running the movement equations to determine a stable end-state. One embodiment uses non-linear conjugate gradient optimization, with a binary line search to find a local minimum in the energy function. This local minimum corresponds to a stable state of the mesh under the given boundary conditions and external forces.

The invention, however, does not depend on using any particular optimization method.

Energy Terms

In one embodiment, the energy function is defined as a sum of several terms.

Elasticity Energy Terms

To simulate the elastic behavior of the material, the description herein of one embodiment of the present invention uses state-of-the-art energy terms as defined, e.g., in D. Baraff and A. Witkin.: "Large Steps in Cloth Simulation." *Proceedings Computer Graphics*, Annual Conference Series: pp. 43-54, 1998, retrieved on Nov. 16, 2007 at www.cs.cm-u.edu/~baraff/papers/sig98.pdf. See also R. Bridson, S. Marino and R. Fedkiw: "Simulation of Clothing with Folds and Wrinkles, in Proceedings, 2003 Proc. ACM/Eurographics/SIGGRAPH Symposium on Computer Animation 2003, pp. 28-36, retrieved on Nov. 23, 2007 at www.cs.ubc.ca/~rbridson/docs/cloth2003.pdf.

In one embodiment, the following terms are included:

Stretch and shear: For each triangle a stretch and shear term is added to the energy function. This term describes the stretch and shear energy for that triangle. The energy is weighted by the area of the triangle and multiplied by a large modulus to make the surface appear stiff.

Bend energy: For each edge between two triangles a bend term is added to the energy function. This term is based on the angle between the planes of the two triangles.

In one embodiment, parts of the surface that include multiple layers are given higher moduli to make them appear stiffer.

Energy Terms for Gas and Liquid Contents

The meshes for flexible packaging often have one or more closed compartments as defined by the garment. For each of those closed compartments, one embodiment includes one or more energy terms to simulate gas or liquid content. This is optional and depends on the application.

To simulate gas content, the user specifies a volume, e.g., via a user interface or in a file of parameters. The gas energy term reaches a minimum when the volume that is enclosed by the compartment equals the specified volume.

A hydrostatic energy term can simulate the effects of liquid content: The user specifies a gravity vector, a liquid volume and a liquid mass. e.g., via a user interface or in a file of parameters. The liquid energy term is the gravity energy of the liquid solid. The liquid solid is defined as the part of the enclosed solid that is below the liquid plane. The liquid plane is defined as a plane perpendicular to the gravity vector that is positioned in such a way that the liquid solid has exactly the specified liquid volume. If the enclosed solid has a volume lower than the liquid volume, there is no liquid plane. In that case, the liquid solid equals the enclosed solid. The gravity energy of a solid is calculated as $$\rho g m (\vec{c}_m \cdot \vec{y})$$

where ρg is a modulus, m is mass, $c_m$ is the center of gravity of the liquid solid and y is an up-vector (opposite of gravity vector)

Figure 10:
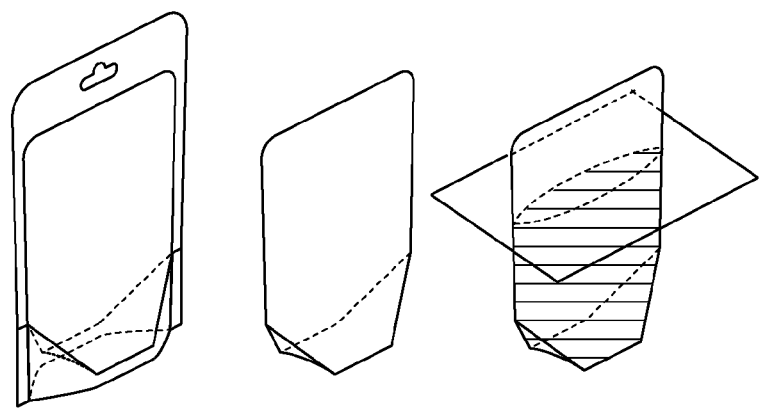
FIG. 10 shows an example of simulation using gas and/or liquid energy terms for simulating the appearance of the packaging example of FIG. 7.

FIG. 10 shows an example using the packaging example of FIG. 7. In this packaging example, the original 8-part garment has three parts that make a closed compartment. A gas and/or liquid energy term can be used for this compartment. In case of liquid energy: The part of the enclosed solid that is below a liquid plane is the liquid solid. The liquid plane is positioned in such a way that the liquid solid has the specified volume. The energy term that simulates the hydrostatic pressure from the liquid is simply the gravity energy of the liquid solid.

It should be noted that liquid content can also be used to roughly simulate the behavior of other types of bulky yet non-rigid content such as flour, dog food, meat balls, and so forth.

Collisions

In one embodiment, additional constraints and collision energy terms are added to prevent the mesh from moving through itself, through the floor, or through other rigid objects. The techniques used in one embodiment for packaging are the same as those used in standard clothing simulation methods.

External Forces

In one embodiment, additional energy terms are added that represent external forces. These external forces can be used as a tool by a user to have some influence on the shape. In one embodiment, a user interface is presented to the user on the display device, on which the user can add springs that attach on one or more points on the surface and pull in a certain direction. The method accepts an indication from the user on the locations and forces. The method includes adding energy terms that corresponding to the springs for running the simulation. How to construct and add such energy terms for such springs would be straightforward for one of ordinary skill in the art, e.g., one with skill in the art of physical simulation.

Making the Solution Visually Smoother

One embodiment includes making the solution visually smoother.

General Principle

To render the mesh on a display device, one could use a general purpose approach (such as Phong interpolation). One embodiment of the present invention takes a different approach. When rendering the mesh, one embodiment includes shading the mesh triangles with a variable normal that has properties that are inspired by the following four properties of flexible packaging:

1) Along the edges of the mesh triangles, the normal is perpendicular to the edge and remains constant along the edge. This will help to give the edge a parabolic appearance.

2) The inside of the mesh triangle is shaded with a continuous normal that is also continuous with the normal at the edges. This will give the inside of the triangle a smooth appearance.

3) The vertices of each triangle are singular points (at such triangle corners, the normal is undefined).

4) In the direct vicinity of the singular points, the normal can rapidly change along the axial direction and it is almost constant along the radial direction, giving the surface the appearance of a generalized cone.

Inverse Baricentric Interpolation

Like Phong shading, in one embodiment, the method does not change geometry but changes only the way that the normals are evaluated to achieve the effect described above. However, the present invention is not limited to using such a technique. For example, in another embodiment, one uses, instead of the flat mesh triangles, higher level geometric surfaces that have the same characteristics as listed above.

One embodiment of the present invention uses an interpolation formula that is termed "inverse baricentric interpolation" herein. Baricentric, also called barycentric interpolation, is commonly used for finite element analysis.

One method embodiment includes using inverse baricentric coordinates as interpolation factors to interpolate between the three edge normals. This yields a normal formula (where s,t and 1-s-t are the baricentric coordinates)

$$s = 0; t > 0; 1 - s - t > 0 \Longrightarrow \vec{n}(s, t) = \vec{n}_1$$

$$s > 0; t = 0; 1 - s - t > 0 \Longrightarrow \vec{n}(s, t) = \vec{n}_2$$

$$s > 0; t > 0; 1 - s - t = 0 \Longrightarrow \vec{n}(s, t) = \vec{n}_3$$

$$s > 0; t > 0;$$

$$1 - s - t > 0 \Longrightarrow \vec{n}(s, t) = \frac{\frac{1}{s}\vec{n}_1 + \frac{1}{t}\vec{n}_2 + \frac{1}{1-s-t}\vec{n}_3}{\left|\frac{1}{s}\vec{n}_1 + \frac{1}{t}\vec{n}_2 + \frac{1}{1-s-t}\vec{n}_3\right|}$$

Figure 11:
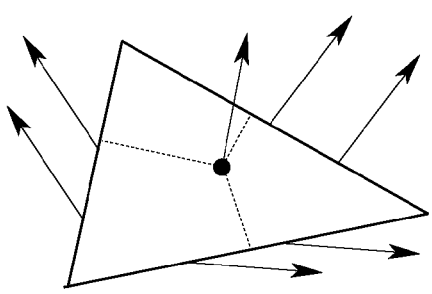
FIG. 11 illustrates interpolation for a single triangular surface according to an example embodiment of the present invention.

FIG. 11 illustrates such interpolation for a single triangular surface. As can be seen, this interpolation for the normal complies with the four properties mentioned above.

Figure 12:
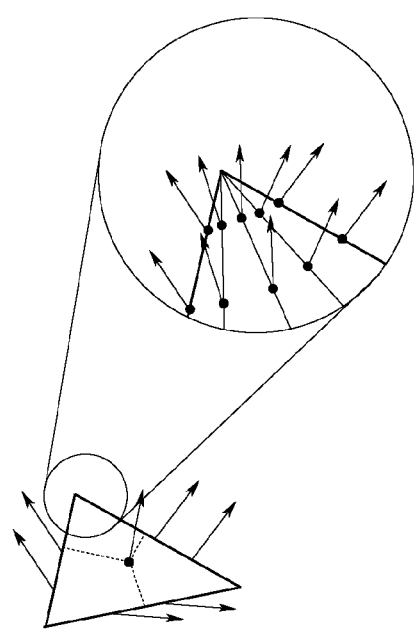
FIG. 12 shows an area near a corner of a triangular surface, and an enlargement thereof to illustrate interpolation for a single triangular surface according to an example embodiment of the present invention.

FIG. 12 shows an area near a corner, and an enlargement thereof. As can be seen, near the corners, the edge interpolation yields a singular point. Note that near the corner of two edges, the weight of the normal of the third edge can be disregarded and the normals are constant along radial lines, suggesting a parabolic shape with very high main curvature and almost zero secondary curvature. Also note that the triangle edges have constant normals $\vec{n}_1$, $\vec{n}_2$, $\vec{n}_3$. These meet properties 1) to 4) described above under "General principle."

Note that since Phong shading is so commonly used, Phong shading is often provided already programmed in graphics hardware, such as graphics chips and controller cards. The shading described herein and the interpolation used therein may be programmed into such hardware using, for example, a programming language that graphics hardware executes. In one embodiment, a combined approach is used. The combined approach includes subdividing the triangles into smaller subtriangles, and using Phong interpolation on the subtriangles to approximate the normal formula. This provides speed advantage, since hardware acceleration is available for the Phong shading.

Subdividing the Triangles for Phong Shading

Figure 13A:
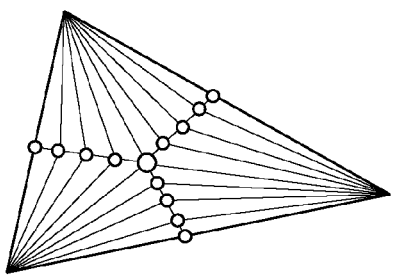
FIG. 13A shows on the left a process of subdividing a triangle into a set of subtriangles according to an embodiment of the present invention.
Figure 13B:
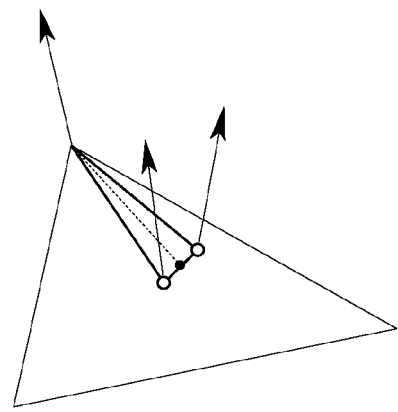
FIG. 13B shows a particular subtriangle of the original triangle of FIG. 13A.

FIG. 13A shows on the left the process of subdividing a triangle into a set of subtriangles. FIG. 13B shows a particular subtriangle of the original triangle.

In one embodiment, to subdivide a triangle, consider new points of the triangle. In one embodiment, these include the triangle's center, e.g., the center of mass, and one or more interpolated points between the triangle's center and each edge center. Using these new points we subdivide the triangle into sub triangles. At each of the original triangle corners there is now a "fan" of thin sub-triangles as shown in the example of FIG. 13A. More interpolated points yield more and thinner sub-triangles. The sub-triangles are now rendered on a display device using Phong shading. Phong shading requires a normal at each subtriangle corner. For the corners that are inside the mesh triangle, the method calculates the normal according to the inverse baricentric interpolation. As edge normals the method uses the normalized average of the normals of the two neighboring triangles. For the subtriangle corners that are on the original triangle corners, where the inverse baricentric interpolation is undefined, the method takes the median line of the subtriangle that goes through that corner and the method uses the limit of the inverse baricentric interpolation function on that line, as it approaches the corner (FIG. 13B).

The method as described gives an approximation of the actual inverse baricentric interpolation. However, it is easy to see that if the number of interpolated points is sufficiently high, this approach approximately complies to the four properties mentioned above under "General principle."

Other Embodiments

While one embodiment includes subdividing the triangles into subtriangles and carrying out Phong shading for the subtriangles, alternate methods also can be used to render and shade the mesh triangles while maintaining the four properties.

A first alternate embodiment includes defining a different interpolation scheme for the normal that follows the same properties.

A second alternate embodiment includes implementing inverse baricentric interpolation in a triangle shading method, and execute the inverse baricentric interpolation by a CPU or graphics processor or digital signal processor (DSP) when rendering the mesh triangles.

Yet another alternate method includes dividing a triangle into subtriangles, but instead of keeping the new points inside the mesh triangles plane, such an alternate method includes changing the position of the new points to make the geometrical shape be a better match to the shape suggested by the normals.

Yet another alternate method includes replacing the mesh triangle with higher level surfaces such as non-uniform rational B-splines (NURBS) that have normals that comply with the four properties mentioned above and are rendered in hardware or software or a combination of both.

One alternate embodiment includes subdividing the mesh-triangles, e.g., as described above for approximating inverse baricentric interpolation by Phong shading, in order to obtain a relatively fine mesh of triangles. The relatively fine mesh is then used in the physical simulation. The resulting mesh of sub-triangles approximates a smooth surface. Because the subtriangles are so thin, aligned with the edges, and fan out from the mesh vertices, the smooth surface that is approximated by the fine mesh will likely comply with the four properties above.

Combining Smooth Mesh Nodes with Singular Nodes

As described herein above as part of the four properties, the inventors have found that including singular points and limited secondary curvature are important qualities in realistic rendering of flexible packaging. One embodiment of the invention, as described above, includes using this knowledge by treating every mesh-node of a given triangular mesh as a singular point (property 3). The visual result resembles a wrinkly piece of flexible packaging. Actual physical packaging however can be a combination of wrinkly parts and relatively smooth parts. One alternate embodiment of the invention extends the above as follows: Certain parts of the mesh are rendered as described in the above described embodiment of the invention without the extension, while others include the extension. The extension includes that other parts of the mesh are rendered in a more conventional smooth way, such as in one version, Phong interpolation. Phong interpolation can have a visual appearance that is not realistic in the case of flexible packaging. However, smooth parts of the surface can be rendered using Phong interpolation. Thus one embodiment includes using method suitable for the smoother parts, and the method constrained by the four properties for the wrinkly part.

Figure 14A:
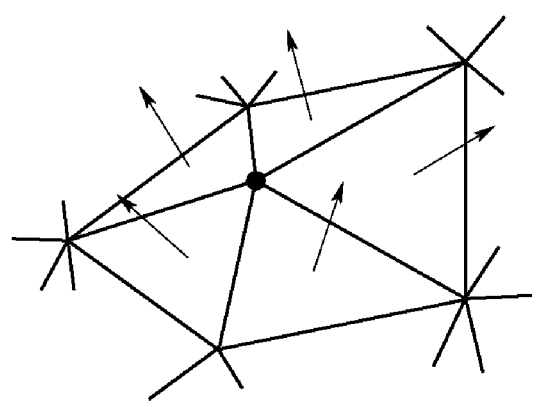
FIG. 14A shows normals of neighboring triangles of a node used to illustrate an embodiment of the present invention.
Figure 14B:
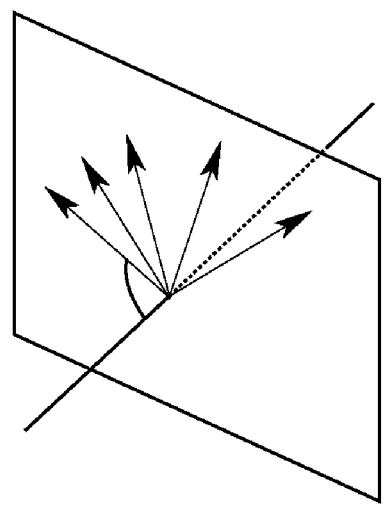
FIG. 14B is an illustration used to described the checking of whether normals lie on a plane, an embodiment of the present invention.
Figure 15A:
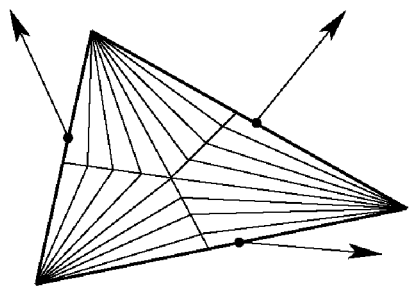
FIGS. 15A, 15B, 15C and 15D respectively show how subdividing proceeds for the case of respective mesh triangles with none, one, two and three smooth vertices, according to an embodiment of the present invention.
Figure 15B:
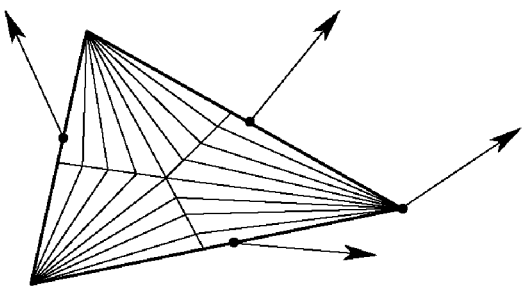
Figure 15C:
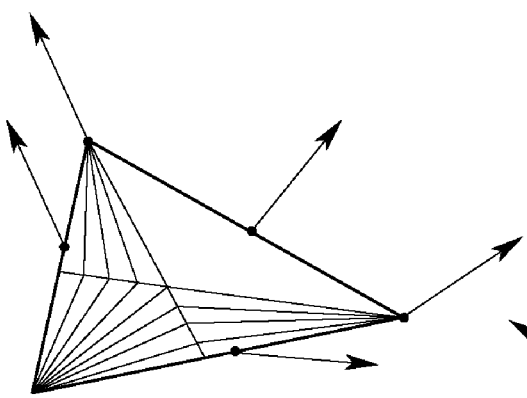
Figure 15D:
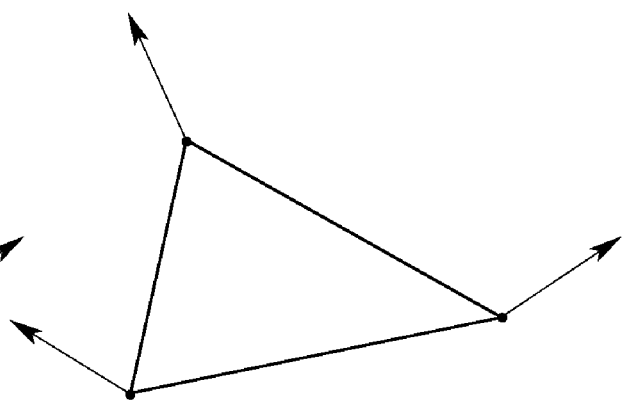

In one extended embodiment, the method obtains the mesh state in the same way as before. For each node, a decision is made to ascertain if the node is "smooth" or "wrinkly" using one or more criteria. In one embodiment, a criterion for ascertaining if wrinkly or smooth includes checking how the surrounding triangles suggest a low secondary curvature. FIG. 14A shows normals of neighboring triangles of a node. For every node, the method collects the normals of the neighboring triangles and checks if there exists another vector that is almost perpendicular to all the normals, the measure of perpendicularity to within a selectable tolerance. In other words, the method includes checking if the normals lie in a plane. See FIG. 14B for the checking if the normals lie on a plane. If such a normal exists, the method flags the point as "smooth," else the node is ascertained to be "wrinkly." One embodiment includes presenting a user interface for the user so that the user can set the tolerance for determining perpendicularity. A relatively high tolerance flags more nodes as "smooth" and allows more secondary curvature, giving the flexible package a more stretchable, rubberlike appearance. A low tolerance on the other hand will give the package a more crisp and wrinkly appearance.

For each of the smooth nodes, the method includes associating a node normal that is the average of the surrounding triangle-normals.

Triangles with three "wrinkly" nodes are rendered as described in the previous above. This is called edge-based interpolation.

Triangles with three "smooth" nodes are rendered with conventional methods, e.g., vertex based interpolation such as Phong interpolation.

For triangles that have both "smooth" and "wrinkly" vertices, the method includes using a normal interpolation scheme that makes a smooth transition from edge-based to vertex based interpolation.

One embodiment uses the following method to deal with triangles that have both "smooth" and "wrinkly" vertices. FIGS. 15A, 15B, 15C and 15D respectively show how subdividing proceeds for the case of respective mesh triangles with none, one, two and three smooth vertices. The smooth vertices have a normal.

In one embodiment, triangles with three "wrinkly" vertices are subdivided and rendered as mentioned earlier for wrinkly surfaces. Triangles with two or one "wrinkly" vertices are also subdivided. Triangles with one "wrinkly" vertex are only subdivided for two thirds.

For edges with a "wrinkly" and a "smooth" vertex edge normals are used by the inverse baricentric interpolation method.

When rendering subtriangles with corners on a smooth vertex, the method uses the associated vertex normal for that corner instead of the limit of the inverse baricentric interpolation. For other subtriangle corners (not on a smooth vertex) the normal calculated with inverse baricentric interpolation is used.

Operation of an Interactive Computer Program

An interactive computer program (application software) was developed that uses the methods described above to allow the user to shape and to visualize in 3-D different kinds of flexible packaging.

One feature of the invention is a computer readable medium on which are encoded executable instructions that when executed cause the methods described herein to be carried out. The execution is on a processing system that includes a display device, a storage subsystem that includes a memory and that also includes one or more hard disks, and one or more processors, including a general purpose processor, and in one embodiment one or more graphics processors. The processing system includes at least one pointing device, e.g., a mouse, and a keyboard that enables a user to enter information into the processing system. As is standard these days, the processing system may be part of a network, and therefore include a network interface. One or more other elements may be included as would be clear to those in the art. The type of processing system is not meant to be limiting, other than for those embodiments that use a special purpose processor such a graphics processor, in which case those embodiments clearly are for use in a processing system that includes such a processor.

A typical session of using one embodiment of the application software proceeds as follows.

The application is started and the user first chooses from a set of templates corresponding to the general category of flexible packaging the user wants to model.

Examples of templates might include but are not limited to "pillow bags", "gussetted bags" and "stand-up pouches". FIG. 16A shows an example of what we call "pillow bag" packaging, FIG. 16B shows an example of what we call a gussetted bag, and FIG. 16C shows an example of what we call a stand-up pouch. Other examples are shown in FIGS. 16D, 16E, and 16F.

The user is presented with a user interface to specify one or more parameters for the selected packaging template. The user via the user interface then specifies values for one or more parameters of the template package, such as its length and width and information about the seals such as the type of seal: lap seal or fin seal, etc., the seal sizes, and so forth. Optionally, if the package will contain a rigid object, e.g., a candy bar, the approximate dimensions of the object can be specified as well.

Based on these parameters the application calculates an initial 3-D mesh roughly approximating the desired shape of the package, and presents a visualization on the display device.

In one embodiment, during typical operation, the application displays three display windows on the display device: a window showing either a 3-D rendering of the package or a representation of the 2-D unfolded sheet it is made of (possibly indicating fold lines, glue areas, dimensions etc.), a tool bar with tools to interact with the shaping package and a window with physical simulation and visualization settings.

Figure 17:
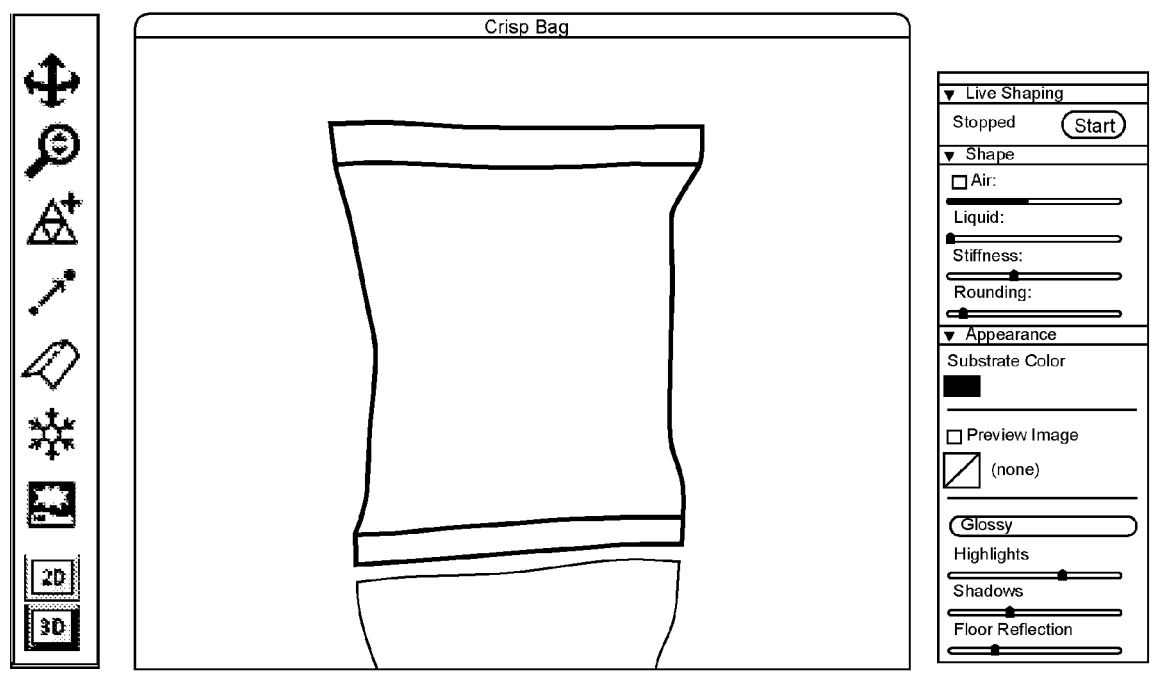
FIG. 17 shows three windows in a screen display used in one embodiment of the invention, including a tool bar window on the left, a window for 3-D visualization in the middle and a window on the right showing simulation and visualization settings.

FIG. 17 shows a display of the three windows of one embodiment, including a tool bar window on the left, a window for a 3-D visualization in the middle—such a window also able to show a 2-D visualization, and a window on the right showing simulation and visualization settings.

The software is organized to include a numerical "engine" that runs in the background and carries out the numerical methods for performing the physical simulation of the package. The methods running on the numerical engine continuously search for a plausible shape of the package that is consistent with all the current user-specified physical parameters and constraints. Meanwhile, intermediate solutions of this shaping process are continuously displayed on a display device. This is called "live shaping".

For simple packages, the constraints are implied by the user-specified basic dimensions of the package. These, combined with the application default parameters of the physical model lead to a visually pleasing 3-D package after just a few seconds of live shaping without user-interaction. This is a testimony to the power of a physically based modeling approach as featured by an embodiment of the invention.

During live-shaping, the user can freely rotate the visualization of the package, zoom in or out or toggle between 2-D and 3-D representations to assess the current package shape.

At any point in time, the user may decide to interact with the live-shaping package using one of the tools from the tool bar, thus directly guiding the live-shaping towards a certain envisioned target shape.

One embodiment includes the following tools. Other embodiments include fewer or more tools.

A "Wrinkle Brush"

Using the wrinkle brush, by dragging a displayed cursor over the package using a pointing device such as a mouse, the 3-D triangle mesh underneath the cursor is locally refined, giving the package at that location a more shop-worn appearance.

A "Grips Tool"

The grips tool is a direct analogy of using one's fingers to manually push or pull a flexible package into a desired shape. The user clicks anywhere on the package surface using the 3-D visualization window, thus selecting a point on the surface of the package, and drags the point using the pointing device, e.g., mouse to indicate the desired target position of this point in 3-D space. During live-shaping a physics engine of the application causes the mesh to deform to fulfill this additional mesh constraint. Any number of such pulling or pushing grip constraints can be added.

A "Fold Line Tool"

Since many real-life packaging designs are manufactured by folding a flat sheet of material into a 3-D shape, one embodiment provides a mechanism for the model to exhibit such folds. In one embodiment, the method will automatically enforce all folds implied by the chosen packaging template without user-interaction. However, the user may wish to add additional folds, for example because the desired shape differs from the template, or to obtain certain creative effects.

In the application, adding a fold line is analogous to using thumb and index fingers of both hands to pick two points of the package and stretch the material between them to its natural length. To add a new fold line, the user simply clicks and drags the cursor over the package in the 2-D or 3-D window suing the pointing device, e.g., mouse to draw a fold line. This has two effects: the triangle mesh is modified to ensure that locally all triangle edges coincide with the fold line, allowing the mesh to bend more easily along the fold line, and the physics engine is instructed to try and keep the fold line unstretched. The user can also modify fold line attributes that influence its visual appearance: a fold line may thus look "hard", as if ironed into the substrate, or "soft", mimicking are more gentle bend.

A "Freeze Tool"

One embodiment includes providing a freeze tool to fix parts of the model. Using the freeze tool, by dragging a displayed cursor over the package using a pointing device such as a mouse, the nodes of the 3-D triangle mesh underneath the cursor are marked as "frozen". The position of frozen nodes are left unmodified by the physics engine. Frozen nodes can also be "defrosted" using the freeze tool.

Adding the printing can be from a file or interactively. Having the 3D simulation has the effect of enabling a user to immediately see in 3-D the effect of changing the printing. Similarly, the printing can be designed in 2-D to produce a desired visualization as viewed in 3-D.

Figure 18:
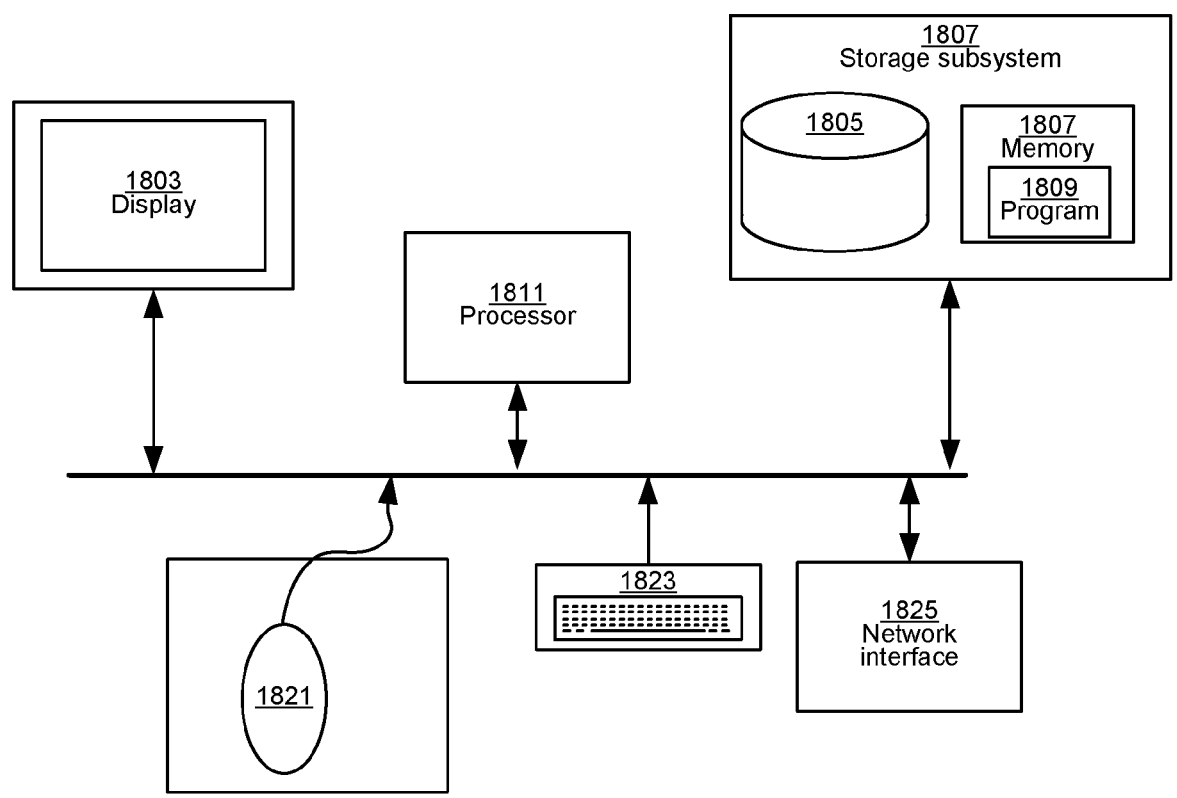
FIG. 18 shows an apparatus that forms one embodiment of the invention. Also shown here is a computer readable medium embodiment of the invention.

FIG. 18 shows an apparatus that forms one embodiment of the invention. The apparatus includes a processing system and a computer readable medium, e.g., a storage medium on which are encoded executable instructions that when executed by the processing system, cause the methods described herein to be carried out. Thus the apparatus is configured, in operation, to carry out the steps described herein, and the method is of operating such an apparatus to carry out the steps of the methods described herein.

The processing system in the apparatus include a display device 1803, a storage subsystem 1807 that includes a memory 1807 and that also includes one or more hard disks 1805, and one or more processors 1811, including a general purpose processor, and in one embodiment one or more graphics processors. The processing system includes at least one pointing device, e.g., a mouse 1821, and a keyboard 1823 that enables a user to enter information into the processing system. As is standard these days, the processing system may be part of a network, and therefore include a network interface 1825. One or more other elements may be included as would be clear to those in the art. The elements coupled together, e.g., by a bus stricture shown in FIG. 18 in simplified form as a single bus. The type of processing system is not meant to be limiting, other than for those embodiments that use a special purpose processor such a graphics processor, in which case those embodiments clearly are for use in a processing system that includes such a processor.

The instructions for causing the processing system are shown in FIG. 18 as element 1809 in the memory. Of course those in the art will understand that parts of the instructions may not all be in memory at the same time. The main point is that there is a computer readable medium on which the instructions are encoded.

Unless specifically stated otherwise, as apparent from the following discussions, it is appreciated that throughout the specification discussions utilizing terms such as "processing," "computing," "calculating," "determining" or the like, refer to the action and/or processes of a computer or computing system, or similar electronic computing device, that manipulate and/or transform data represented as physical, such as electronic, quantities into other data similarly represented as physical quantities.

In a similar manner, the term "processor" may refer to any device or portion of a device that processes electronic data, e.g., from registers and/or memory to transform that electronic data into other electronic data that, e.g., may be stored in registers and/or memory. A "computer" or a "computing machine" or a "computing platform" may include one or more processors.

Note that when a method is described that includes several elements, e.g., several steps, no ordering of such elements, e.g., steps are implied, unless specifically stated.

The methodologies described herein are, in one embodiment, performable by one or more processors that accept computer-readable (also called machine-readable) logic encoded on one or more computer-readable media containing a set of instructions that when executed by one or more of the processors carry out at least one of the methods described herein. Any processor capable of executing a set of instructions (sequential or otherwise) that specify actions to be taken are included. Thus, one example is a typical processing system that includes one or more processors. Each processor may include one or more of a CPU, a graphics processing unit, and a programmable DSP unit. The processing system further may include a memory subsystem including main RAM and/or a static RAM, and/or ROM. A bus subsystem may be included for communicating between the components. The processing system further may be a distributed processing system with processors coupled by a network. If the processing system requires a display, such a display may be included, e.g., a liquid crystal display (LCD) or a cathode ray tube (CRT) display. If manual data entry is required, the processing system also includes an input device such as one or more of an alphanumeric input unit such as a keyboard, a pointing control device such as a mouse, and so forth. The term memory unit as used herein, if clear from the context and unless explicitly stated otherwise, also encompasses a storage system such as a disk drive unit. The processing system in some configurations may include a sound output device, and a network interface device. The memory subsystem thus includes a computer-readable medium on which is encoded logic (e.g., software) including a set of instructions to cause performing, when executed by one or more processors, one of more of the methods described herein. The software may reside in the hard disk, or may also reside, completely or at least partially, within the RAM and/or within the processor during execution thereof by the computer system. Thus, the memory and the processor also constitute computer-readable medium on which is encoded logic, e.g., in the form of instructions.

Furthermore, a computer-readable medium may form, or be included in a computer program product.

Note that while some diagram(s) only show(s) a single processor and a single memory on which is encoded the logic including instructions, those in the art will understand that many of the components described above are included, but not explicitly shown or described in order not to obscure the inventive aspect. For example, while only a single machine is illustrated, the term "machine" shall also be taken to include any collection of machines that individually or jointly execute a set (or multiple sets) of instructions to perform any one or more of the methodologies discussed herein.

It will be understood that the steps of methods discussed are performed in one embodiment by an appropriate processor (or processors) of a processing (i.e., computer) system executing instructions stored in storage. It will also be understood that embodiments of the present invention are not limited to any particular implementation or programming technique and that the invention may be implemented using any appropriate techniques for implementing the functionality described herein. Furthermore, embodiments are not limited to any particular programming language or operating system.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the above description of example embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the DESCRIPTION OF EXAMPLE EMBODIMENTS are hereby expressly incorporated into this DESCRIPTION OF EXAMPLE EMBODIMENTS, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

In the description provided herein, numerous specific details are set forth. However, it is understood that embodiments of the invention may be practiced without these specific details. In other instances, well-known methods, structures and techniques have not been shown in detail in order not to obscure an understanding of this description.

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

All publications, patents, and patent applications cited herein are hereby incorporated by reference.

Any discussion of prior art in this specification should in no way be considered an admission that such prior art is widely known, is publicly known, or forms part of the general knowledge in the field.

In the claims below and the description herein, any one of the terms comprising, comprised of or which comprises is an open term that means including at least the elements/features that follow, but not excluding others. Thus, the term comprising, when used in the claims, should not be interpreted as being limitative to the means or elements or steps listed thereafter. For example, the scope of the expression a device comprising A and B should not be limited to devices consisting only of elements A and B. Any one of the terms including or which includes or that includes as used herein is also an open term that also means including at least the elements/features that follow the term, but not excluding others. Thus, including is synonymous with and means comprising.

Similarly, it is to be noticed that the term coupled, when used in the claims, should not be interpreted as being limitative to direct connections only. The terms "coupled" and "connected," along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B which may be a path including other devices or means. "Coupled" may mean that two or more elements are either in direct physical or electrical contact, or that two or more elements are not in direct contact with each other but yet still co-operate or interact with each other.

Thus, while there has been described what are believed to be the preferred embodiments of the invention, those skilled in the art will recognize that other and further modifications may be made thereto without departing from the spirit of the invention, and it is intended to claim all such changes and modifications as fall within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

We claim:

1. A method of operating a processing apparatus to render on a display device a model of a surface of paper or foil wrinkly material usable for packaging, the method comprising:
   accepting a garment, being a description of the different parts of the surface of paper or foil wrinkly material, and how and where any of the parts are connected;
   discretizing the garment to form a triangular mesh comprising triangles;
   modeling the physics of the triangular mesh, and running a simulation to find a stable end-state for the triangular mesh, including defining an energy function and modifying the triangular mesh to achieve a lower energy value;
   modifying the triangular mesh to visually smooth the mesh in a way that is perceived as typical for paper or foil flexible packaging material; and
   rendering the model on a display device,
   wherein the modifying the triangular mesh to visually smooth the mesh includes modifying the triangular mesh during the rendering or modifying the triangular mesh prior to the rendering,
   wherein the rendering includes shading mesh triangles,
   wherein the shading of a mesh triangle uses normals that vary across the mesh triangle with limited secondary curvature in a manner characteristic of paper or foil wrinkly material, and
   wherein the shading includes approximately meeting each of four normal conditions including:
      along the edges of the mesh triangles, except for the vertices of the mesh triangles, the normal remains constant;
      the inside of each mesh triangle is shaded with a continuous normal that is also continuous with the normal at the edges of the mesh to give the inside of the mesh triangle a smooth appearance;
      the vertices of each mesh triangle are singular points; and
      in the direct vicinity of the singular points, the normal changes along the axial direction and the normal is constant along the radial direction.

2. A method as recited in claim 1, wherein the triangular mesh is a coarse triangular mesh.

3. A method as recited in claim 2, wherein the triangular mesh is irregular.

4. A method as recited in claim 2, wherein the triangular mesh is irregular and the discretizing uses constrained Delaunay triangulation.

5. A method as recited claim 2, wherein the rendering uses inverse baricentric interpolation, including using inverse baricentric coordinates as interpolation factors to interpolate between the three edge normals of a mesh triangle.

6. A method as recited in claim 2, wherein the rendering includes subdividing each mesh triangle into subtriangles wherein a relatively simple shading method can be used.

7. A method as recited in claim 6, further comprising using normalized average of the normals of two neighboring mesh triangles as the normals of edges of two neighboring mesh triangles, and subtriangle corners, using the median line of the subtriangle that goes through the corner of subtriangles.

8. A method as recited in claim 6, further comprising moving points in the subtriangles to make the geometrical shape match better to the shape suggested by the normals.

9. A method as recited in claim 2,
wherein mesh triangles of the triangular mesh are replaced prior to or during rendering into primitives of higher level than triangles, and
wherein the rendering includes shading, and wherein shading of a primitive uses normals that vary across the surface of each primitive with relatively low secondary curvature in a manner characteristic of wrinkly material.

10. A method as recited in claim 1, wherein the modeling the physics of the mesh, and running a simulation to find a stable end-state for the mesh includes a gas energy term.

11. A method as recited in claim 1, wherein the modeling the physics of the mesh, and running a simulation to find a stable end-state for the mesh includes a liquid energy term.

12. A method as recited in claim 1, wherein the modeling the physics of the mesh, and running a simulation to find a stable end-state for the mesh includes collision detection for any rigid object contained within the packaging.

13. A method as recited in claim 1, further comprising:
providing a user interface for a user to indicate external forces to apply to one or more points of the surface; and
accepting the user indication.

14. A method as recited in claim 2, further comprising:
for each node, making a decision to ascertain if the node is "smooth" or "wrinkly" using one or more criteria; and
for the parts that are wrinkly, applying a method in which the rendering includes shading, and wherein shading of a triangle uses normals that vary across the triangle with relatively low secondary curvature in a manner characteristic of paper or foil wrinkly material, and
for the part that is not wrinkly applying conventional shading.

15. A method as recited in claim 14, wherein a criterion for ascertaining if wrinkly or smooth in a mesh triangle of the mesh includes checking how the surrounding triangles suggest a low secondary curvature.

16. A method as recited in claim 14, wherein how the surrounding mesh triangles suggest is based on the normals of surrounding triangles.

17. A method as recited in claim 1, wherein the surface of paper or foil wrinkly material is packaging.

18. An apparatus comprising:
a processing system including at least one processor, a display device, and a storage device,
the processing system configured to carry out rendering a model of a surface of wrinkly material on the display device,
the processing system further configured to:
accept a garment, being a description of the different parts of the surface of paper or foil wrinkly material, and how and where any of the parts are connected;
discretize the garment to form a triangular mesh comprising triangles;
model the physics of the mesh, and run a simulation to find a stable end-state for the triangular mesh, including defining an energy function and modifying the triangular mesh to achieve a lower energy value; and
modify the triangular mesh to smooth the mesh in a way that is perceived as typical for paper or foil flexible packaging material; and
render the model on the display device,
wherein the modifying the triangular mesh to visually smooth the mesh includes modifying the triangular mesh during the rendering or modifying the triangular mesh prior to the rendering,
wherein the rendering includes shading mesh triangles, and
wherein the shading of a mesh triangle uses normals that vary across the mesh triangle with limited secondary curvature in a manner characteristic of paper or foil wrinkly material, and
wherein the shading includes approximately meeting each of four normal conditions including:
along the edges of the mesh triangles, except for the vertices of the mesh triangles, the normal remains constant;
the inside of each mesh triangle is shaded with a continuous normal that is also continuous with the normal at the edges of the mesh to give the inside of the mesh triangle a smooth appearance;
the vertices of each mesh triangle are singular points; and
in the direct vicinity of the singular points, the normal changes along the axial direction and the normal is constant along the radial direction.

19. An apparatus as recited in claim 18, wherein the discretizing is to a relatively coarse irregular triangular mesh.

20. An apparatus as recited in claim 18, wherein the rendering uses inverse baricentric interpolation, including using inverse baricentric coordinates as interpolation factors to interpolate between the three edge normals of a mesh triangle.

21. A non-transitory computer readable medium encoding instructions that when executed by one or more processors of a processing system, cause carrying out a method of rendering on a display device a model of a surface of paper or foil wrinkly material usable for packaging, the method comprising:
accepting a garment, being a description of the different parts of the surface of paper or foil wrinkly material, and how and where any of the parts are connected;
discretizing the garment to form a triangular mesh comprising triangles;
modeling the physics of the triangular mesh, and running a simulation to find a stable end-state for the triangular mesh, including defining an energy function and modifying the triangular mesh to achieve a lower energy value;

modifying the triangular mesh to visually smooth the mesh in a way that is perceived as typical for paper or foil flexible packaging material; and rendering the model on the display device, wherein the modifying the triangular mesh to visually smooth the mesh includes modifying the triangular mesh during the rendering or modifying the triangular mesh prior to the rendering, wherein the rendering includes shading mesh triangles, wherein the shading of a mesh triangle uses normals that vary across the mesh triangle with limited secondary curvature in a manner characteristic of paper or foil wrinkly material, and wherein the shading includes approximately meeting each of four normal conditions including:

along the edges of the mesh triangles, except for the vertices of the mesh triangles, the normal remains constant;

the inside of each mesh triangle is shaded with a continuous normal that is also continuous with the normal at the edges of the mesh to give the inside of the mesh triangle a smooth appearance;

the vertices of each mesh triangle are singular points; and in the direct vicinity of the singular points, the normal changes along the axial direction and the normal is constant along the radial direction.

22. A non-transitory computer-readable medium as recited in claim 21, wherein the triangular mesh is a relatively coarse irregular triangular mesh.

23. A non-transitory computer-readable medium as recited in claim 21, wherein the rendering uses inverse baricentric interpolation, including using inverse baricentric coordinates as interpolation factors to interpolate between the three edge normals of a mesh triangle.

* * * * *